United States Patent
Cattaneo-Vietti et al.

(10) Patent No.: US 6,821,423 B2
(45) Date of Patent: Nov. 23, 2004

(54) PROCESS AND APPARATUS FOR SUBMERGED BIODEPURATION OF EFFLUENTS DISPOSED OF IN THE SEA

(75) Inventors: Riccardo Cattaneo-Vietti, Genoa (IT); Giorgio Bavestrello, Rapallo (IT); Umberto Benatti, Genoa (IT); Carlo Cerrano, Genoa (IT); Marco Giovine, Mignanego (IT)

(73) Assignees: Consiglio Nazionale Delle Ricerche, Rome (IT); Comue Di Rapallo, Rapallo (IT)

(*) Notice: Subject to any disclaimer, the term of this patent is extended or adjusted under 35 U.S.C. 154(b) by 0 days.

(21) Appl. No.: 10/250,969
(22) PCT Filed: Jan. 4, 2002
(86) PCT No.: PCT/IB02/00037
§ 371 (c)(1), (2), (4) Date: Nov. 5, 2003
(87) PCT Pub. No.: WO02/055442
PCT Pub. Date: Jul. 18, 2002

(65) Prior Publication Data
US 2004/0065609 A1 Apr. 8, 2004

(30) Foreign Application Priority Data
Jan. 10, 2001 (IT) ..................... MI2001A0024

(51) Int. Cl.[7] .............. C02F 3/32; C02F 3/06
(52) U.S. Cl. .............. 210/602; 210/615; 210/150; 210/170
(58) Field of Search .......... 210/602, 615–617, 210/150, 151, 170, 260, 908

(56) References Cited

U.S. PATENT DOCUMENTS 4,008,155 A 2/1977 Castell 5,618,413 A 4/1997 Todd et al.

FOREIGN PATENT DOCUMENTS

| GB | 2 248 057 A | | 3/1992 |
|---|---|---|---|
| JP | 6-296996 | * | 10/1994 |
| WO | WO 97/33789 | * | 9/1997 |
| WO | WO 99/01388 | * | 1/1999 |

OTHER PUBLICATIONS

Patent Abstracts of Japan, vol. 200, No. 16, May 08, 2001 & JP 2001–025785 A, Jan. 30, 2001.

Patent Abstracts of Japan, vol. 013, No. 461, Oct. 18, 1989 & JP 01 180289 A, Jul. 18,1989.

Patent Abtracts of Japan, vol. 009, No. 184, Jul. 30, 1985 & JP 60 054 789 A, Mar. 29, 1985.

Database WPI, Section Ch, Week 199911, Derwent Publications Ltd., London, GB; AN 1999–124161, XP00220301.

Patent Abtracts of Japan, vol. 1999, No. 03, Mar. 31, 1999 & JP 0337589 A, Dec. 22, 1998.

* cited by examiner

Primary Examiner—Fred G. Prince
(74) Attorney, Agent, or Firm—Nixon & Vanderhye P.C.

(57) ABSTRACT

A process and a plant to carry out the purification in the sea of effluents (waste waters), in which the submarine biopurification of the latter is envisaged, when discharged into the sea.

The process and the plant of the invention favor the dilution, in the sea, and recycling of the organic substances contained in the sewage, carrying out the correct disposal of the effluent and the desired cut down of the bacterial load contained in it.

7 Claims, 3 Drawing Sheets

PROCESS AND APPARATUS FOR SUBMERGED BIODEPURATION OF EFFLUENTS DISPOSED OF IN THE SEA

This application is the US national phase of international application PCT/IB02/00037 filed 04 Jan. 2002, which designed the US.

BACKGROUND OF THE INVENTION

The present invention concerns a new process and the relative submerged plant, suitable for carrying out the submarine biopurification of the effluents (waste waters) discharged into the sea.

The field of the invention is that of the equipment used to purify, using marine organisms, the effluents (waste waters) discharged into the sea.

One of the most serious problems that arises in the operation of sewage disposal of small coastal towns, concerns the large difference in effluent volumes to be treated in the space of a year. In fact, during the summer season, peaks can be reached which are ten times greater than the winter averages. This prevents optimum functioning of the purification plants and has led to most civil services in coastal towns opting for the realization of pipes pouring out to sea. Also the lower costs and easier management suggested such a choice. However, pipes pouring out to sea have been realized, in most cases, without considering the hydrodynamic conditions of the receptor (the space of sea in front of) and often the sewage, untreated or only treated from a physical point of view (screening, sand trapping and sedimentation), arrives close to the shore due to the unfavourable interplay of currents, with well known unfortunate hygienic-health and aesthetic consequences. On the other hand, the costs to take the pipe and its diffuser down to an optimum depth (over 50–60 metres in depth) are prohibitive for the majority of Italian coastal towns.

OBJECT OF THE INVENTION

The main aim of the present invention is to provide a process, and relative plant, suitable for allowing the disposal of effluent into the sea, which avoids drawbacks arising, connected with the discharge of sewage by means of traditional underwater pipes.

An additional aim of the invention is to provide a plant and a process that allow the aforesaid disposal, diluting and recycling the organic substances contained, in the sewage, cutting down the bacterial load so as to achieve the correct disposal of the effluent.

DESCRIPTION

These and other aims of the invention are accomplished with the process and plant of the claims 1 and 7 respectively. Additional characteristics of the invention result from the remaining claims.

As regards known systems of sewage disposal into the sea, the process and plant according to the invention offer the advantage of overcoming both the hygienic-health drawbacks, as well as aesthetic ones unresolved until now. In addition, the process and plant according to the invention have the advantage of favouring the dilution in the sea and the recycling of organic substances contained in the sewage, carrying out the correct disposal of the effluent also through the desired cutting down the bacterial load contained in it.

These and other aims, characteristics and advantages result from the preferred way of accomplishing the process and plant of the invention illustrated, by way of a non-limiting example, in the figures of the enclosed tables of drawings, in which.

Figure 1:
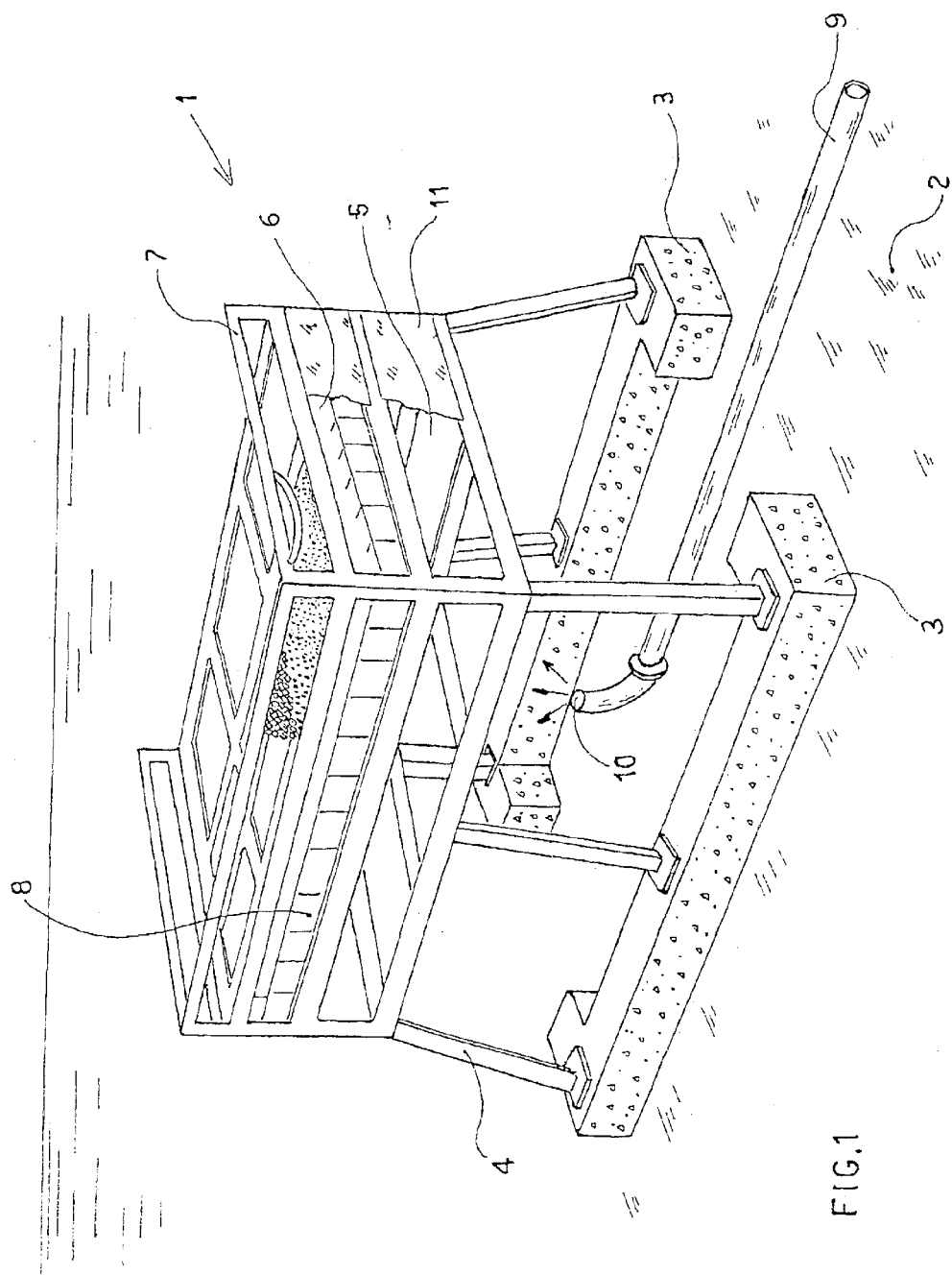
FIG. 1 illustrates an overall perspective view of the plant of the invention.
Figure 2:
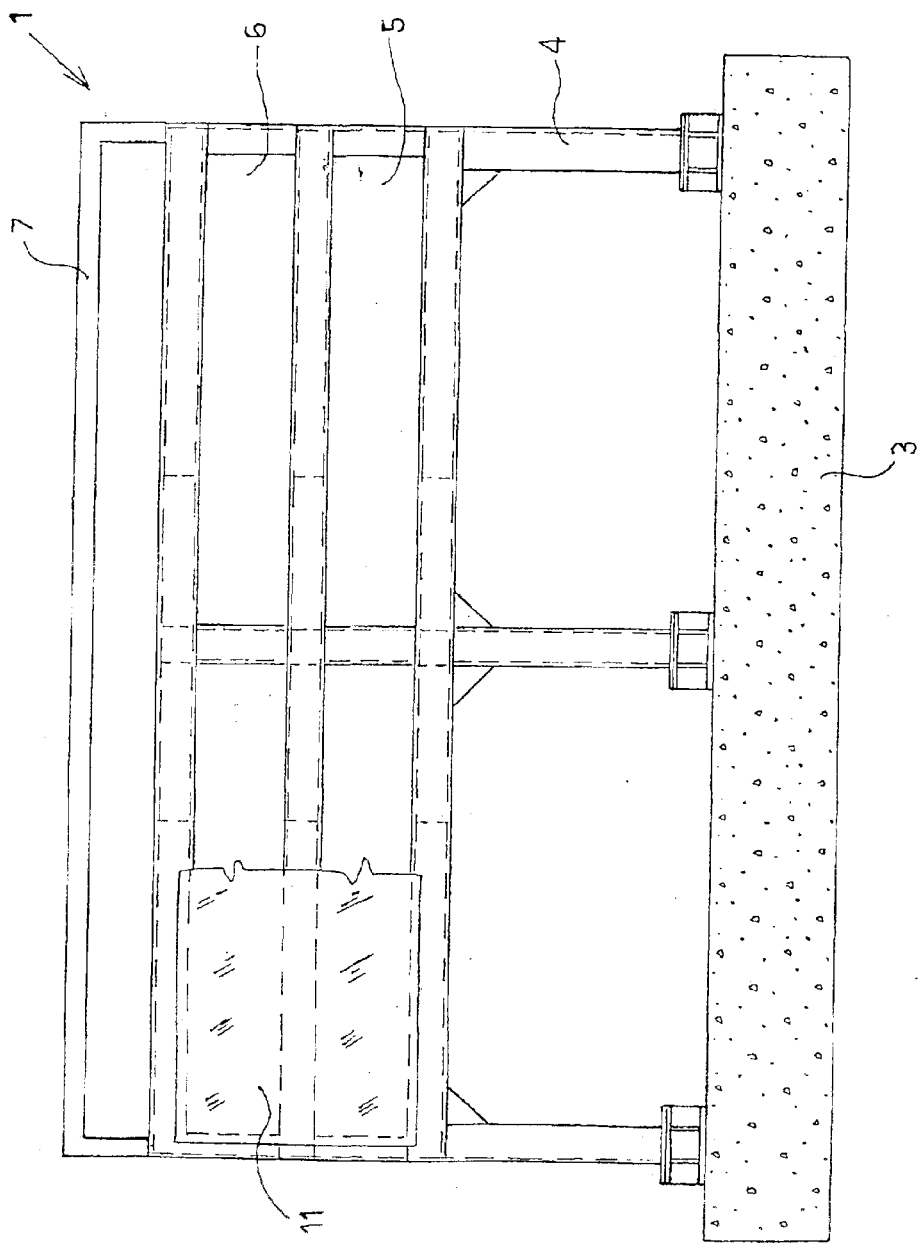
FIG. 2 illustrates a longitudinal view of the plant of FIG. 1.
Figure 3:
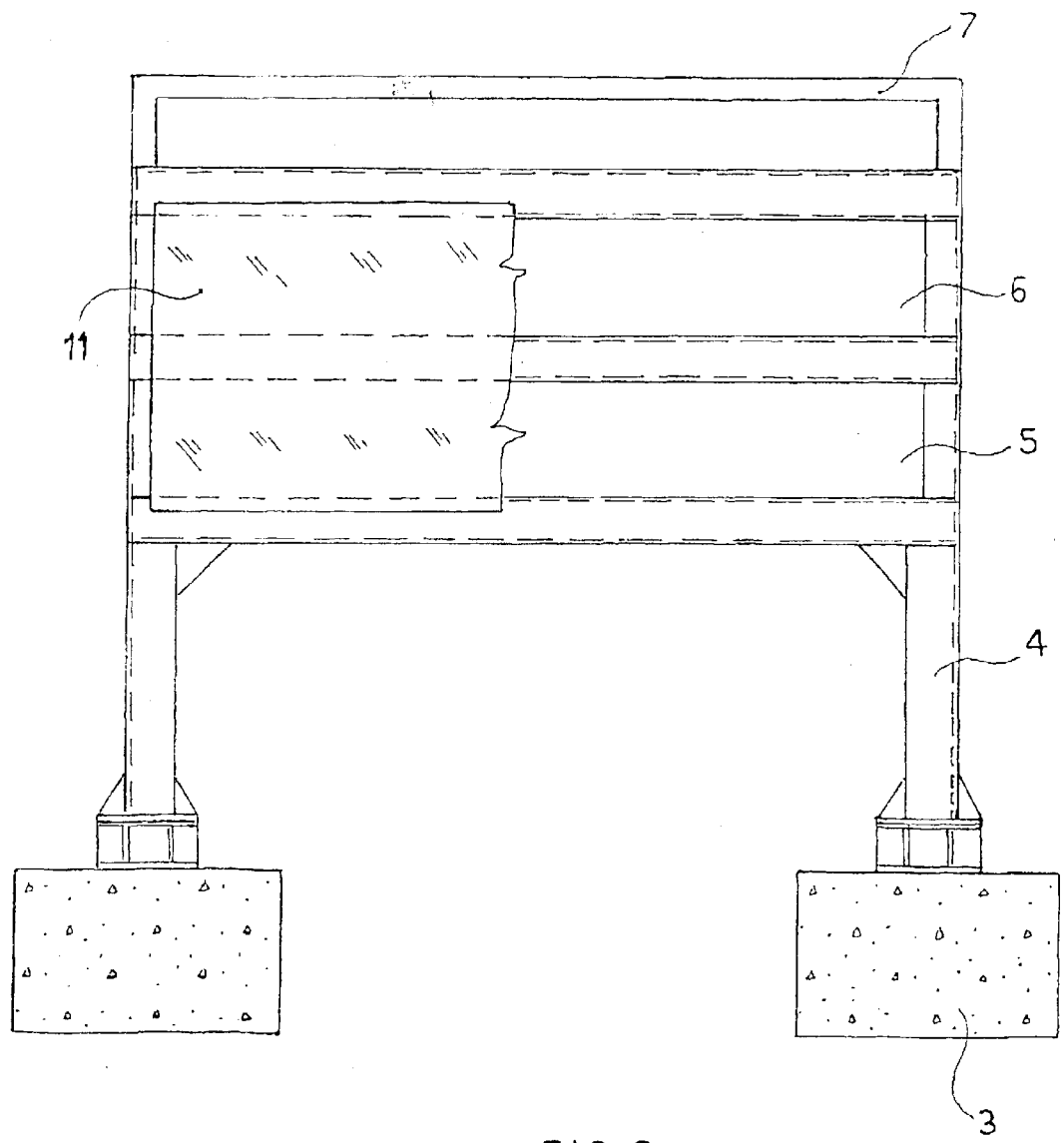
FIG. 3 illustrates a side view of the plant of FIG. 1.

The plant shown in FIG. 1 consists of a load bearing framework 1 placed and anchored on the seabed 2 by means of appropriate anchor logs 3 (for example some concrete castings), in turn fixed to the legs 4 of the same framework. The latter identifies in particular, directly supported by the legs 4, a chamber 5 that defines the collection place of the effluent, a chamber 6 equipped with inert material, of high specific surface, of support for the microfilter feeder organisms and an upper frame 7 of support for the macrofilter feeder organisms. These chambers 5 and 6 are sidewise closed by containment bulkheads 11, able to define a place closed in a lateral direction, but open from below upwards, in the direction of the sewage outflow towards the column of sea water above the plant.

In addition, the filtering chamber 6 is provided with inert support materials 8 for the biopurification microorganisms of the effluent while, under the plant, is located the conveyance pipe 9 of the effluents (waste waters) in the direction of and inside the chamber 5.

The outgoing effluents (waste waters), in submarine environment, from the outlet 10 of the pipe 9, rise due to the difference in density inside the chamber 5 of the purification plant. Thanks to the presence of the side containment bulkheads 11, dispersion of the sewage into the surrounding marine environment is avoided, instead allowing its conveyance in the direction of the filtering chamber 6 above, inside which are carried out the stages of mineralization and cutting down of the bacterial load executed by the microorganisms installed in the respective support material 8.

On leaving the chamber 6, the purified effluent is subjected to subsequent filtering on the part of the macrofilter feeder organisms, naturally settled or artificially introduced on the upper frame 7. On leaving this frame, one has the definitive dilution and diffusion of the purified effluent in the column of sea water above.

Preferably, the organisms present on the filtering support 8 are not only made up of a rich colony of microorganisms (Protozoa, bacteria and microalgae), but also of an extensive population of filter feeders such as Lamellibranchia and poriferan molluscs, suitable for drawing the various fractions of the suspended organic substance.

The process according the invention, achieved with the plant described, therefore comprises the following stages:

the submarine feeding of the effluent inside a respective collection chamber that has, in its upper part, a filtering chamber containing the biopurification organisms and which acts as a percolating filter of the effluent;

the passage, due to the difference in density, of the effluent through the cited percolating filter, in the direction of the column of sea water above; and the discharge and dilution of the biopurified effluent into the marine environment.

In particular, during the passage through the cited filtering chamber, the sewage undergoes the following treatment:

mineralization of the organic substance, in the course of which the same is transformed into its basic components; and the cutting down of the bacterial load due to the action of the filter feeder organisms (macro and microorganisms), naturally settled in the filtering structure.

The study of the different parameters of the column of sea water situated above the frame 7 of the plant of the invention, highlights how the slowness of the flow through the filter 8 and the biological activity which develops in the latter allow an increase in the dilution capacity of the system, a cutting down of the pollution indices and a more favourable dispersion of the sewage into the marine environment. In addition, while the values of TSM (Total Suspended Matter) and COD (Chemical Oxygen Demand) in the column of water above the plant according to the invention remain constant in the period taken into consideration, indicative of a good level of flow through the filter, the total and faecal coliform values show a drop of 90% in the same period.

The underwater observations carried out to assess the efficiency of the system, have given rise to the following comments:

- the structure functions normally and has never suffered damage from sea storms;
- the cathode protection of metallic parts of the plant avoids any instance of corrosion;
- the different types of filtering materials have an abundant bacterial flora;
- the structure houses numerous macrobenthic organisms;
- the porous structure of the filtering elements helps the natural autopurification of the water;
- macrofilter feeders (sponges and bivalves) have settled inside the filtering elements;
- the filters are an excellent substratum for the growth of microorganisms (fungi and bacteria) and meiobenthic organisms;
- the presence of these organisms triggers a trophic network, not present up to that moment, which involves pelagic and benthic predators;
- the structure, fixed to the seabed, constitutes a deterrent to the activity of illegal trawling.

The results obtained so far highlight the efficiency of the prototype as a substitute system of biological purification plants on land. In particular, to be highlighted are the improvement in the standard bacteriological parameters and the establishing of a trophic chain peculiar to the plant of the invention, which is able to develop and survive with the energetic contribution of the effluent and despite the inevitable sudden changes in salinity, especially during the high summer loads.

The plant of the invention has proved suitable for operating in a submarine environment, is easy to run and with much reduced costs, hence suitable for small coastal towns with high tourist interest, usually penalized by land placed structures, almost never experiencing optimum operations because of the high load variations (often also made tenfold) during periods of increased tourism.

Such structure allows the selection of organism groups, able to carry out their entire life cycle using the energy coming from the urban effluent, converting it into biomass and whose disposal comes within the normal trophic cycles of the marine environment.

What is claimed is:

1. A process for submarine biopurification in the sea of effluents discharged into the sea, wherein the submarine biopurification is based on a percolating filter principle with flow of the effluent from below due to a difference in density towards a column of sea water above, passing through a biopurification stage, said effluent being fed upwardly to a collection chamber which is closed on its sides and open from below and above then upwardly to a biopurification percolating filter which is closed on its sides and open from said collection chamber below upwardly to the column of sea water.

2. The process according to claim 1, wherein the effluent inside the collection chamber is fed upwardly to a filtering chamber containing submarine biopurification organisms which act as a percolating filter for the effluent, passing the effluent through the percolating filter, in the direction of the column of sea water above, and discharging and diluting the thus biopurified effluent to the marine environment.

3. The process according to claim 2, wherein the effluent is biopurified by treatment in an initial percolating filter containing filtering microorganisms and in a subsequent percolating filter containing macrofilter feeder organisms.

4. The process according to claim 3, wherein underwater biopurification of the effluent includes mineralization of organic material contained in the effluent transforming it into its basic components thereby reducing a bacterial load due to the action of the microfilter feeder organisms.

5. A process according to claim 1, wherein the effluent is biopurified by microorganisms selected from protozoa, bacteria, and microalgae, and microorganisms selected from Lamellibranchia and poriferan mollusks.

6. A process according to claim 1, wherein the biopurification filter contains organisms that are naturally settled or artificially introduced into the filter.

7. An apparatus for submarine biopurification in the sea of waste effluents discharged into the sea, comprising:
   an effluent outlet pipe,
   a submerged load bearing framework with legs fixed to a ballast such that a chamber is above the effluent outlet pipe,
   the load bearing framework including a collection chamber closed on its sides and open on the effluent outlet pipe and open above,
   a biopurification filter above the collection chamber closed on its sides and open below to the collection chamber and open above, and
   a microfilter above the biopurification filter open below to the biopurification filter and open above and at its sides to sea water above,
   wherein the submarine biopurification is based on a percolating filter principle with flow of the effluent from below, due to a difference in density, towards a column of sea water above, passing through a biopurification stage, said effluent being fed upwardly to a collection chamber which is closed on its sides and open from below and above then upwardly to a biopurification percolating filter which is closed on its sides and open from said collection chamber below upwardly to the column of sea water.

* * * * *